United States Patent Office 2,917,427
Patented Dec. 15, 1959

2,917,427

THERMOSETTING RESINS AND HIGH WET STRENGTH PAPERS PREPARED THEREFROM

Francis A. Bonzagni, Springfield, Oscar P. Cohen, Longmeadow, and Albert H. Markhart, Indian Orchard, Mass., assignors to Monsanto Chemical Company, St. Louis, Mo., a corporation of Delaware No Drawing. Application December 14, 1955
Serial No. 553,159

9 Claims. (Cl. 162—167)

The present invention relates to novel thermosetting resins and to high wet strength papers prepared therefrom.

The employment of thermosetting resins in the manufacture of high wet strength papers is well known. The method most frequently employed to prepare such wet strength papers comprises adding a small quantity of an electrically charged thermosetting resin to the paper furnish before preparing the sheet therefrom.

The thermosetting resins most widely employed in the manufacture of wet strength paper are cationic melamine-formaldehyde resins and cationic urea-formaldehyde resins. There are advantages and disadvantages associated with the use of both the melamine and the urea resins. The primary advantage of the cationic melamine resins is that, in general, they will give higher wet strength in the papers prepared therefrom than can be obtained with the cationic urea resins presently available to the art. One of the disadvantages of the melamine resins is that they have poor stability in aqueous solutions and must be dried before they will have adequate storage life. Before use, the dried melamine resins must be dissolved in strong acid solutions and aged for several hours before use. In ease of handling and applying the resin to the paper fibers, the cationic urea resins are in nearly all cases equal to or superior to the cationic melamine resins. Unfortunately, the wet strengths of paper obtainable from the cationic urea resins presently available to the art are not as high as those obtainable from the cationic melamine resins.

It is an object of this invention to provide novel thermosetting resins having utility as wet strength additives in the manufacture of paper.

Another object of this invention is to provide papers of high wet strength, which papers contain novel thermosetting resins as a wet strength additive.

Other objects and advantages of this invention will become apparent from the following detailed description thereof.

A novel class of thermosetting resins has been discovered. These resins are co-condensation products of 1 mol of urea, 2.0–3.0 mols of formaldehyde, 0.05–0.3 mol of melamine and 0.1–0.3 mol of alkanolamine and are polymerized to the extent that a 35% aqueous solution thereof has a viscosity of at least 15 centipoises at 25° C. These resinous co-condensation products are highly substantive to cellulosic fibers and impart high wet strength to papers prepared therefrom.

The following examples are set forth to illustrate more clearly the principle and practice of this invention to those skilled in the art. All parts are by weight.

EXAMPLE I

Dimethylol urea is prepared by condensing 2 mols of formaldehyde with 1 mol of urea at a pH of about 8.

Hexamethylol melamine is prepared by condensing 0.78 mol of formaldehyde with 0.13 mol of melamine at a pH of about 8.

The dimethylol urea and hexamethylol melamine described in the two paragraphs immediately above are admixed with 0.16 mol of triethanolamine and sufficient hydrochloric acid to adjust the pH of the resulting solution to 6.5. The solution is heated until the solution viscosity has increased to C on the Gardner-Holdt scale.

EXAMPLE II

Dimethylol urea is prepared by condensing 2 mols of formaldehyde with 1 mole of urea at a pH of about 8.

Hexamethylol melamine is prepared by condensing 1.5 mols of formaldehyde with 0.25 mol of melamine at a pH of about 8.

The dimethylol urea and hexamethylol melamine described in the two paragraphs immediately above are admixed with 0.24 mol of triethanolamine and sufficient hydrochloric acid to adjust the pH of the resulting solution to 6.5. The solution is heated until the solution viscosity has increased to C on the Gardner-Holdt scale.

EXAMPLE III

One hundred pounds of a resin solution containing 35% solids is prepared as follows:

To a suitable stirred reaction vessel equipped with heating and cooling means are charged 34 pounds of 37% formalin and 5.6 pounds of 91% paraform and these are stirred until the paraform is completely dissolved. To this solution are added 5.5 pounds of triethanolamine and sufficient 85% formic acid to adjust the pH to 7.0–7.5. After adding 13 pounds of urea and 3 pounds of melamine, the solution is adjusted to a pH of 7.0 with sodium hydroxide and heated to 65–75° C. for 30 minutes. The pH is then adjusted to 6.8–7.0 with 85% formic acid and the reaction temperature is raised to 90–95° C. and maintained at this temperature until the viscosity reaches K on the Gardner-Holdt scale. If needed, more 85% formic acid is added to adjust the pH to 6.8–7.0 and the temperature is dropped to 75° C. and maintained at this temperature until the viscosity increases to T–V on the Gardner-Holdt scale. After the pH is adjusted to 7.4 with sodium hydroxide, 36 pounds of water is added to the reaction mixture and the product is cooled to room temperature.

In several of the subsequent examples the physical properties of hand made paper sheets are reported. In all cases, the sheets are prepared on a Noble and Wood sheet machine with the paper sheets measuring 8 inches by 8 inches and weighing 2.5 grams. The sheets are dried for 6 minutes at 200–205° F. to approximate the heat history of paper prepared on commercial Fourdrinier machines. Tensile data are obtained on a Schopper tensile tester and the results are reported on the basis of pounds per inch width unless otherwise noted. The sheets on which wet tensile strengths are determined are wetted by thoroughly soaking the paper sheets in distilled water and removing the excess water by pressing the sheets tightly between large blotters.

EXAMPLE IV

Part A

The resinous co-condensation product in Example I is evaluated by incorporating the resin into a paper furnish of unbleached kraft pulp in the ratio of three parts resin solids per 100 parts cellulosic fibers. A hand sheet prepared from the resin treated furnish has a wet tensile of 5.5 pounds per inch width.

Part B

The resinous co-condensation product of Example II is evaluated as described in Part A above and a hand sheet prepared therefrom has a wet tensile strength of 6.0 pounds per inch width.

EXAMPLE V

The resinous co-condensation product of Example III is evaluated by incorporating varying quantities of the resin solids in a furnish of unbleached northern kraft pulp containing 5% alum and preparing hand sheets therefrom. Both dry and wet tensile strengths are obtained on the uncured sheets and wet tensile strengths are obtained on the sheets after curing them by heating for 30 minutes at 105° C. The data obtained are set forth below in Table I.

TABLE I

| Wt. Percent Resin in Paper | Dry Tensile, lbs./inch | Wet Tensile, lbs./inch | *$\frac{T_W}{T_D} \times 100$ | Cured Wet Tensile lbs./inch |
|---|---|---|---|---|
| 0.5 | 25.1 | 3.55 | 14.1 | 4.55 |
| 1.0 | 28.0 | 4.95 | 17.7 | 6.35 |
| 1.5 | 28.5 | 5.65 | 19.8 | 8.05 |

*$T_W$ = wet tensile; $T_D$ = dry tensile.

EXAMPLE VI

The resinous co-condensation product of Example III is evaluated as a wet strength resin in a bleached sulfite furnish employing the techniques and procedures described in Example V. The data obtained are set forth below in Table II.

TABLE II

| Wt. Percent Resin in Paper | Dry Tensile, lbs./inch | Wet Tensile, lbs./inch | *$\frac{T_W}{T_D} \times 100$ | Cured Wet Tensile lbs./inch |
|---|---|---|---|---|
| 0.5 | 15.8 | 2.20 | 14.0 | 2.85 |
| 1.0 | 16.9 | 3.05 | 18.0 | 4.00 |
| 1.5 | 17.2 | 3.70 | 21.5 | 4.50 |

*$T_W$ = wet tensile; $T_D$ = dry tensile.

EXAMPLE VII

The resinous co-condensation product of Example III is evaluated in a bleached northern kraft furnish employing the techniques and methods set forth in Example V. For purposes of comparison, a similar evaluation is made on a leading proprietary cationic urea resin (henceforth referred to as proprietary urea resin A). The data obtained are set forth below in Table III.

TABLE III

| Resin | Wt. Percent Resin in Paper | Dry Tensile, lbs./inch | Wet Tensile, lbs./inch | *$\frac{T_W}{T_D} \times 100$ | Cured Wet Tensile, lbs./inch |
|---|---|---|---|---|---|
| Expl. III | 0.5 | 22.3 | 1.75 | 7.8 | 2.80 |
|  | 1.0 | 23.6 | 2.50 | 10.6 | 4.40 |
|  | 1.5 | 23.5 | 3.00 | 12.8 | 5.50 |
| Proprietary Urea Resin A | 0.5 | 22.4 | 1.35 | 6.1 | 2.20 |
|  | 1.0 | 23.4 | 2.00 | 8.6 | 3.40 |
|  | 1.5 | 23.2 | 2.15 | 9.3 | 3.80 |

*$T_W$ = wet tensile; $T_D$ = dry tensile.

As seen in the above table, the wet strengths obtained with the resin of this invention are markedly superior to those obtained with the proprietary cationic urea resin at all levels tested.

EXAMPLE VIII

Example VI is repeated employing a different batch of bleached sulfite furnish and proprietary urea resin A of Example VII is also evaluated for comparison purposes. The data obtained are set forth in Table IV.

TABLE IV

| Resin | Wt. Percent Resin in Paper | Dry Tensile, lbs./inch | Wet Tensile, lbs./inch | *$\frac{T_W}{T_D} \times 100$ | Cured Wet Tensile, lbs./inch |
|---|---|---|---|---|---|
| Expl. III | 0.5 | 14.8 | 2.35 | 15.9 | 3.00 |
|  | 1.0 | 15.5 | 3.05 | 19.7 | 3.90 |
|  | 1.5 | 17.2 | 3.80 | 22.0 | 4.70 |
| Proprietary Urea Resin A | 0.5 | 15.6 | 1.95 | 12.5 | 2.45 |
|  | 1.0 | 16.5 | 2.65 | 16.0 | 3.45 |
|  | 1.5 | 16.8 | 3.25 | 19.3 | 3.50 |

*$T_W$ = wet tensile; $T_D$ = dry tensile.

As seen from the above table, the wet strengths obtained with the resin of this invention are materially superior to those obtained with the proprietary cationic urea resin at each level tested.

EXAMPLE IX

The resinous co-condensation product of Example III was employed in a commercial paper mill trial under full scale operation conditions. Thirty pound bag paper was prepared from bleached kraft pulp and 2% resin solids was added to the furnish at the machine chest, after the Jordan. The test was run continuously for three and a half hours and samples of the paper produced were taken at the beginning of the test, at the end of the test and at approximately the middle of the test. Dry tensile strengths were measured on the paper as produced and wet tensile strengths were measured after curing the paper by the application of heat.

For purposes of comparison, an identical test was run employing the proprietary urea resin A described in Example VII. The data obtained are set forth below in Table V.

TABLE V

| Resin | Sample No. | Dry Tensile, lbs./inch | Wet Tensile (cured), lbs./inch | *$\frac{T_W}{T_D} \times 100$ |
|---|---|---|---|---|
| Expl. III | 1 | 25.3 | 6.9 | 27.2 |
|  | 2 | 24.3 | 6.3 | 26.0 |
|  | 3 | 22.7 | 5.9 | 26.0 |
| Average |  | 24.1 | 6.4 | 25.6 |
| Proprietary Urea Resin A | 1 | 19.7 | 4.8 | 24.4 |
|  | 2 | 24.3 | 5.5 | 22.6 |
|  | 3 | 25.8 | 4.8 | 18.4 |
| Average |  | 23.3 | 5.0 | 21.4 |

*$T_W$ = wet tensile; $T_D$ = dry tensile.

It is seen from the above table that the average wet tensile strength obtained with the resin of this invention was approximately 28% higher than that obtained with the prior art proprietary cationic urea resin.

EXAMPLE X

A second full scale mill trial was run in which the resinous co-condensation product of Example III was employed as a wet strength resin in the manufacture of 28 pound unbleached kraft toweling. The furnish was prepared from 100% clean corrugated cuttings and the resin solids were added thereto at a concentration of 0.85% on the dry weight of the cellulosic fibers. The test was run over approximately two hours and samples were taken at the beginning of the test, at the end of the test and at approximately the middle thereof.

At the conclusion of the test, a control test was run employing proprietary urea resin A described in Example VIII at a concentration of 1.0% on the cellulosic fibers. The data obtained are set forth below in Table VI.

TABLE VI

| Resin | Sample No. | Dry Tensile, lbs./inch | Wet Tensile, lbs./inch | Wet Tensile (cured), lbs./inch |
|---|---|---|---|---|
| Exp. III | 1 | 3.5 | 1.74 | 2.90 |
|  | 2 | 2.8 | 1.81 | 2.45 |
|  | 3 | 3.8 | 1.64 | 2.70 |
| Average |  | 3.4 | 1.73 | 2.68 |
| Proprietary Urea Resin A | 1 | 3.2 | 1.34 | 2.00 |
|  | 2 | 3.0 | 1.52 | 2.22 |
|  | 3 | 2.9 | 1.54 | 1.78 |
| Average |  | 3.0 | 1.47 | 2.00 |

From the above table it is seen that materially higher wet strengths were obtained with the resin of this invention than were obtained with the prior art cationic urea resin. This is especially outstanding in view of the fact that the resin of this invention was employed at a 15% lower concentration than the prior art cationic urea resin.

EXAMPLE XI

The resinous co-condensation product of Example III was evaluated at three different concentrations in another full scale mill trial. The pulp consisted of 30% soft wood kraft and 70% hard wood kraft that was treated in the beater with 2% soda ash and sufficient alum to adjust the final pH to 4.5. The paper produced was crepe towel stock having a basic weight of thirty pounds.

For purposes of comparison another test was run on the same paper stock employing a proprietary cationic urea resin (henceforth identified as proprietary urea resin B). The results are set forth below in Table VII.

TABLE VII

| Resin | Wt. Percent Resin in Paper | Wet Tensile-MD,[1] lbs./0.5 inch | Wet Tensile-CD,[2] lbs./0.5 inch | Cured Wet Tensile-MD,[1] lbs./0.5 inch |
|---|---|---|---|---|
| Control |  | 0 | 0.25 | 0.18 |  |
| Expl. III | 0.5 | 0.63 | 0.47 |  |
|  | 1.0 | 0.90 | 0.68 |  |
|  | 1.5 | 0.95 | 0.81 | 1.81 |
| Proprietary Urea Resin B | 0.5 | 0.42 | 0.35 |  |
|  | 1.0 | 0.58 | 0.41 |  |
|  | 1.5 | 0.79 | 0.64 | 1.37 |

[1] MD=machine direction.
[2] CD=cross direction.

It is seen from the above table that the results obtained with the resin of this invention were markedly superior to the results obtained with the proprietary cationic urea resin at all three levels of resin application.

The resins of this invention are co-condensation products of urea, formaldehyde, melamine and an alkanolamine conforming to the formula:

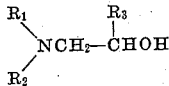

where: $R_1$ and $R_2$ are independently selected from the group consisting of hydrogen, alkyl radicals containing up to 4 carbon atoms, a beta-hydroxyethyl group and a beta-hydroxypropyl group, and $R_3$ is selected from the group consisting of hydrogen and methyl radicals.

Examples of alkanolamines conforming to the above formula include ethanolamine, diethanolamine, triethanolamine, diethylaminoethanol, methyldiethanolamine, etc. It is preferred to prepare the co-condensation products of this invention from alkanolamines which contain no amino hydrogen atoms, e.g., ethyldiethanolamine, and it is especially preferred to prepare such co-condensation products from triethanolamine.

The proportions of the four reactants included in the co-condensation products are critical. For each mol of combined urea, the co-condensation product should contain from about 2.0 to about 3.0 mols of formaldehyde, from about 0.05 to about 0.3 mol of melamine and from about 0.1 to about 0.3 mol of alkanolamine. In a preferred embodiment of the invention, the co-condensation products contain for each mol of combined urea 2.2 to 2.6 mols of formaldehyde, 0.05 to 0.15 mol of melamine and 0.13 to 0.20 mol of alkanolamine. Although some resinous co-condensation products falling outside the ranges herein set forth may have some utility in improving the wet strength of paper, such resinous co-condensation products will not have the highly desirable balance of physical and chemical properties which characterize the compositions of this invention. In particular, the co-condensation products falling outside of the range herein specified will not have the high substantivity to cellulosic paper making fibers, the water solubility and the storage stability which characterize the compositions herein described.

The resinous co-condensation products of this invention are polymerized to the extent that a 35% aqueous solution thereof has the viscosity of at least 15 centipoises at 25° C. The co-condensation products may be polymerized to as high a viscosity as desired short of the point at which the resin gels and becomes water insoluble. For optimum storage life, the polymerization should not be carried appreciably beyond the point at which the viscosity reaches 35 centipoises at 20° C.

The co-condensation products are preferably prepared by simply charging the four reactants to a reactor and heating as illustrated in Example III. Other modes for effecting the reaction may be employed, however, so long as the four reactants are intercondensed in the final product, cf. Examples I and II. The condensation reaction is carried out in a neutral to basic solution, e.g., at a pH of 6.5 to 12. Where the co-condensation product is to be made, sold and stored as an aqueous solution, the pH of the final solution must be approximately neutral. For this reason it is preferable to carry out the condensation reaction in an approximately neutral solution so that a minimum of inorganic salts will be introduced into the final product by neutralizing excess alkali.

The reactants employed will be the conventional commercial grades of these materials. In the case of the formaldehyde reactant, however, it has been observed that the stability of aqueous solutions of the resinous co-condensation products is very markedly increased by employing 40–55 weight percent aqueous formaldehyde solutions in lieu of the conventional 37% formalin. The concentration of the formaldehyde should not be increased materially above 55%, however, as the wet strength reinforcing properties of the resins fall off when higher formaldehyde concentrations are employed.

When the co-condensation products are employed as wet strength resins, they may be applied to the paper fibers in any known manner. The most practical method for preparing wet strength paper from these resins is to add a small quantity of the resin to the paper furnish at any point prior to the preparation of the sheet therefrom. The co-condensation products also may be applied to the paper fibers in other manners such as by impregnating semifinished paper sheets in a solution of the resin. The amount of resin employed is that customarily employed with conventional wet strength resins, viz., from about 0.1% to about 5.0%.

The above descriptions and particularly the examples are set forth by way of illustration only. Many other variations and modifications of the invention can be made without departing from the spirit and scope of the invention herein described.

What is claimed is:
1. A water-soluble, partially polymerized resinous co-condensation product of reactants consisting of 1 mol of urea, 2.0 to 3.0 mols of formaldehyde, 0.05 to 0.3 mol of melamine and 0.1 to 0.3 mol of an alkanolamine, said co-condensation product being polymerized to the extent that a 35% aqueous solution thereof has a viscosity of at least 15 centipoises at 25° C., the alkanolamine included in the co-condensation product conforming to the formula:

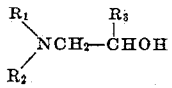

where: $R_1$ and $R_2$ are independently selected from the group consisting of hydrogen, alkyl radicals containing up to 4 carbon atoms, a beta-hydroxyethyl group and a beta-hydroxypropyl group, and $R_3$ is selected from the group consisting of hydrogen and methyl radicals.

2. The compositions of claim 1 in which the alkanolamine employed is triethanolamine.

3. A method for preparing the compositions of claim 2 which comprises heating a mixture of reactants consisting of 1 mol of urea, a 40–55% aqueous solution of formaldehyde containing 2.0 to 3.0 mols of formaldehyde, 0.05 to 0.3 mol of melamine and 0.1 to 0.3 mol of triethanolamine at a pH of 6.5 to 12.0 until a resinous co-condensation product is obtained which has a viscosity of at least 15 centipoises when measured in a 35% aqueous solution at 25° C.

4. A water-soluble, partially polymerized resinous co-condensation product of reactants consisting of 1 mol of urea, 2.2 to 2.6 mols of formaldehyde. 0.05 to 0.15 mol of melamine, and 0.13 to 0.20 mol of an alkanolamine, said co-condensation product being polymerized to the extent that a 35% aqueous solution thereof has a viscosity of at least 15 centipoises at 25° C., the alkanolamine included in the co-condensation product conforming to the formula:

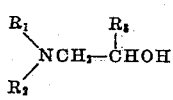

where: $R_1$ and $R_2$ are independently selected from the group consisting of hydrogen, alkyl radicals containing up to 4 carbon atoms, a beta-hydroxyethyl group and a beta-hydroxypropyl group, and $R_3$ selected from the group consisting of hydrogen and methyl radicals.

5. A water-soluble, partially polymerized resinous co-condensation product of reactants consisting of 1 mol of urea, 2.7 mols of formaldehyde, 0.11 mol of melamine and 0.18 mol of triethanolamine, said co-condensation product being polymerized to the extent that a 35% aqueous solution thereof has a viscosity of at least 15 centipoises at 25° C.

6. A paper sheet of high wet tensile strength composed of waterlaid cellulosic fibers which have deposited thereon 0.1 to 5.0 weight percent of an initially water-soluble, partially polymerized resinous co-condensation product of reactants consisting of 1 mol or urea, 2.0 to 3.0 mols of formaldehyde, 0.05 to 0.3 mol of melamine and 0.1 to 0.3 mol of an alkanolamine, said co-condensation product being polymerized to the extent that a 35% aqueous solution thereof has a viscosity of at least 15 centipoises at 25° C., the alkanolamine included in the co-condensation product conforming to the formula:

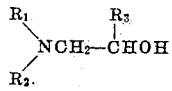

where: $R_1$ and $R_2$ are independently selected from the group consisting of hydrogen, alkyl radicals containing up to 4 carbon atoms, a beta-hydroxyethyl group and a beta-hydroxypropyl group, and $R_3$ is selected from the group consisting of hydrogen and methyl radicals.

7. A paper sheet of high wet tensile strength composed of waterlaid cellulosic fibers which have deposited thereon 0.1 to 5.0 weight percent of an initially water-soluble, partially polymerized resinous co-condensation product of reactants consisting of 1 mol of urea, 2.7 mols of formaldehyde, 0.11 mol of melamine and 0.18 mol of triethanolamine, said co-condensation product being polymerized to the extent that a 35% aqueous solution thereof has a viscosity of at least 15 centipoises at 25° C.

8. A process for preparing a waterlaid paper sheet of high wet tensile strength which comprises preparing a suspension of 100 parts by weight of cellulosic papermaking fibers in water, adding to said suspension 0.1 to 5.0 parts by weight of a resin, preparing a waterlaid sheet from said suspension, and drying said sheet; said resin being a water-soluble, partially polymerized resinous co-condensation product of reactants consisting of 1 mol. of urea, 2.0 to 3.0 mols of formaldehyde. 0.05 to 0.3 mol of melamine and 0.1 to 0.3 mol of an alkanolamine, said co-condensation product being polymerized to the extent that a 35% aqueous solution thereof has a viscosity of at least 15 centipoises at 25° C., the alkanolamine included in the co-condensation product conforming to the formula:

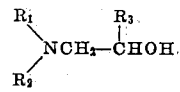

where: $R_1$ and $R_2$ are independently selected from the group consisting of hydrogen, alkyl radicals containing up to 4 carbon atoms, a beta-hydroxyethyl group and a beta-hydroxypropyl group, and $R_3$ is selected from the group consisting of hydrogen and methyl radicals.

9. A process for preparing a waterlaid paper sheet of high wet tensile strength which comprises preparing a suspension of 100 parts by weight of cellulosic papermaking fibers in water, adding to said suspension 0.1 to 5.0 parts by weight of a resin, preparing a waterlaid sheet from said suspension, and drying said sheet; said resin being a water-soluble, partially polymerized resinous co-condensation product of reactants consisting of 1 mol of urea, 2.7 mols of formaldehyde, 0.11 mol of melamine and 0.18 mol of triethanolamine, said co-condensation product being polymerized to the extent that a 35% aqueous solution thereof has a viscosity of at least 15 centipoises at 25° C.

References Cited in the file of this patent

UNITED STATES PATENTS

| Number | Name | Date |
|---|---|---|
| 2,197,357 | Widmer et al. | Apr. 16, 1940 |
| 2,326,727 | Schroy | Aug. 10, 1943 |
| 2,328,425 | D'Alelio | Aug. 31, 1943 |
| 2,407,376 | Maxwell | Sept. 10, 1946 |
| 2,485,079 | Wohnsiedler et al. | Oct. 18, 1949 |
| 2,577,767 | Jones | Dec. 11, 1951 |

FOREIGN PATENTS

| Number | Country | Date |
|---|---|---|
| 1,102,968 | France | May 18, 1955 |
| 627,167 | Great Britain | Aug. 2, 1949 |